(12) United States Patent
McLean et al.

(10) Patent No.: US 11,631,159 B2
(45) Date of Patent: Apr. 18, 2023

(54) ZOOM CONTROL OF DIGITAL IMAGES ON A DISPLAY SCREEN

(71) Applicant: Lenovo Enterprise Solutions (Singapore) Pte. Ltd., Singapore (SG)

(72) Inventors: Virginia A. McLean, Raleigh, NC (US); James G. McLean, Raleigh, NC (US)

(*) Notice: Subject to any disclaimer, the term of this patent is extended or adjusted under 35 U.S.C. 154(b) by 276 days.

(21) Appl. No.: 16/836,830

(22) Filed: Mar. 31, 2020

(65) Prior Publication Data
US 2021/0303117 A1 Sep. 30, 2021

(51) Int. Cl.
| | |
|---|---|
| G06F 3/0484 | (2022.01) |
| G06T 3/40 | (2006.01) |
| G06T 3/20 | (2006.01) |
| H04N 1/393 | (2006.01) |
| H04N 1/40 | (2006.01) |
| G06F 3/041 | (2006.01) |

(52) U.S. Cl.
CPC .............. *G06T 3/4092* (2013.01); *G06T 3/20* (2013.01); *H04N 1/393* (2013.01); *H04N 1/40068* (2013.01); *G06F 3/0412* (2013.01); *G06F 3/0416* (2013.01); *G06F 3/0484* (2013.01)

(58) Field of Classification Search
CPC . G06T 3/4092; H04N 1/40068; G06F 3/0484; G06F 3/0412; G06F 3/0416
See application file for complete search history.

(56) References Cited

U.S. PATENT DOCUMENTS

| | | | |
|---|---|---|---|
| 6,281,874 B1* | 8/2001 | Sivan | G06F 16/51 707/E17.031 |
| 6,396,523 B1* | 5/2002 | Segal | G06F 3/04883 348/E5.103 |
| 6,731,285 B2* | 5/2004 | Matchen | G06T 3/40 345/428 |
| 7,069,237 B1* | 6/2006 | Tate | H04N 1/00135 705/26.8 |
| 7,991,837 B1* | 8/2011 | Tahan | G06F 3/0481 348/240.3 |
| 10,972,744 B2* | 4/2021 | Venkitasubramani | H04N 19/59 |
| 2005/0134578 A1* | 6/2005 | Chambers | G06F 3/0486 345/157 |
| 2008/0189751 A1* | 8/2008 | Weaver | H04N 21/23424 725/105 |

(Continued)

*Primary Examiner* — Phenuel S Salomon
(74) *Attorney, Agent, or Firm* — Jeffrey Streets; Streets Lawfirm

(57) ABSTRACT

A computer program product and apparatus suitable may perform operations including receiving a first digital image, and identifying a pixel resolution of a display, the pixel resolution of the display being less than a pixel resolution of the first digital image. The operations may further include providing first data to the display to cause display of the first digital image at an image resolution adapted to the identified pixel resolution, wherein a section of the first digital image displayed on the display includes a first area of the display. The operations may further include receiving a user-initiated instruction to zoom in on the section of the first digital image, and providing, in response to receiving the user-initiated instruction, second data to the display to cause display of the section of the first digital image over a second area of the display that is greater than the first area.

20 Claims, 6 Drawing Sheets

(56) References Cited

U.S. PATENT DOCUMENTS

| | | | |
|---|---|---|---|
| 2008/0198177 A1* | 8/2008 | Niemi | G06T 3/4092 345/660 |
| 2008/0222273 A1* | 9/2008 | Lakshmanan | G06F 16/9577 709/219 |
| 2011/0010629 A1* | 1/2011 | Castro | H04L 67/04 455/414.3 |
| 2012/0166538 A1* | 6/2012 | Son | H04L 41/044 709/204 |
| 2014/0300643 A1* | 10/2014 | Urosev | G06F 3/14 345/660 |
| 2015/0128215 A1* | 5/2015 | Son | H04L 63/102 707/827 |
| 2016/0041737 A1* | 2/2016 | Castello | G06F 3/0484 715/800 |

* cited by examiner

ZOOM CONTROL OF DIGITAL IMAGES ON A DISPLAY SCREEN

BACKGROUND

The present disclosure relates to the control over digital images, such as streaming digital video images.

BACKGROUND OF THE RELATED ART

Many computing devices support the use of a pointing device to interact with a graphical user interface. For example, a simple computer mouse may support pointing and clicking, which may be combined into a drag gesture that is useful for moving a graphical element or a portion of a graphical element from one point on a screen to another. A more advanced computer mouse may include a scroll wheel to facilitate control over a direction and amount of scrolling an image.

Touchpads and touchscreens may enable multi-touch gestures that provide additional ways to interact with a graphical user interface. In general, touchpads and touchscreens both have a touch-sensitive matrix that enables similar types of gestures, but a touchscreen integrates the touch-sensitive matrix into the display screen. Common gestures on a touch-sensitive matrix may include both one finger gestures, such as a tap, press, swipe, pan, and flick, as well as multiple finger gestures, such as a tap, press, swipe, zoom, pinch and rotate. Of course, a device must have both the touch-sensitive hardware and associated software in order to make these useful gestures available to the user and many consumer electronics devices do not have a touch-sensitive matrix. While a touchscreen is now a standard feature of a smartphone, tablet computer and some notebook computers, many computer monitors, televisions and other categories of devices and display screens do not include a touchpad or touchscreen.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations may comprise receiving a first digital image, and identifying a pixel resolution of a display screen, the pixel resolution of the display screen being less than a pixel resolution of the first digital image. The operations may further comprise providing first data to the display screen to cause display of the first digital image at an image resolution adapted to the identified pixel resolution of the display screen, wherein a section of the first digital image displayed on the display screen at the image resolution adapted to the identified pixel resolution of the display screen comprises a first area of the display screen. The operation may still further comprise receiving a user-initiated instruction to zoom in on the section of the first digital image, and providing, in response to receiving the user-initiated instruction to zoom in on the section of the first digital image, second data to the display screen to cause display of the section of the first digital image over a second area of the display screen that is greater than the first area of the display screen.

Some embodiments provide a computer program product comprising a non-volatile computer readable medium and non-transitory program instructions embodied therein, the program instructions being configured to be executable by a processor to cause the processor to perform various operations. The operations may comprise identifying the pixel resolution of a display screen, and providing first data to the display screen to cause display of a first digital image at an image resolution adapted to the identified pixel resolution. The operations may further comprise receiving a user-initiated instruction to zoom in on a section of the first digital image, and providing, in response to receiving the user-initiated instruction to zoom in on the section of the first digital image, second data to the display screen to cause display of the section of the first digital image over an area of the display screen that is greater than an area of the display screen that displays the section of the digital image produced using the first data, wherein the second data causes display of the section of the first digital image at the image resolution adapted to the identified pixel resolution.

Some embodiments provide an apparatus comprising at least one non-volatile storage device storing program instructions and at least one processor configured to process the program instructions, wherein the program instructions are configured to, when processed by the at least one processor, cause the apparatus to perform various operations. The operations may comprise receiving a first digital image, and identifying a pixel resolution of a display screen, the pixel resolution of the display screen being less than a pixel resolution of the first digital image. The operations may further comprise providing first data to the display screen to cause display of the first digital image at an image resolution adapted to the identified pixel resolution of the display screen, wherein a section of the first digital image displayed on the display screen at the image resolution adapted to the identified pixel resolution of the display screen comprises a first area of the display screen. The operation may still further comprise receiving a user-initiated instruction to zoom in on the section of the first digital image, and providing, in response to receiving the user-initiated instruction to zoom in on the section of the first digital image, second data to the display screen to cause display of the section of the first digital image over a second area of the display screen that is greater than the first area of the display screen.

Some embodiments provide a computer program product comprising a non-volatile computer readable medium and non-transitory program instructions embodied therein, the program instructions being configured to be executable by a processor to cause the processor to perform various operations. The operations may comprise identifying the pixel resolution of a display screen, and providing first data to the display screen to cause display of a first digital image at an image resolution adapted to the identified pixel resolution. The operations may further comprise receiving a user-initiated request to download the digital image being displayed on the display screen, and initiating, in response to receiving the user-initiated instruction to download the first digital image displayed on the display screen, transmission of second data for the first digital image to a designated device and/or a designated folder, wherein the second data has an image resolution that is greater than the first data.

Some embodiments provide a computer program product comprising a non-volatile computer readable medium and non-transitory program instructions embodied therein, the program instructions being configured to be executable by a processor of a mobile computing device to cause the processor to perform various operations. The operations may comprise establishing a wireless connection with a digital media controller that is providing a digital image to a display screen, receiving input from a touch-screen of the mobile device to control a pan function and/or a zoom function, and wirelessly transmitting the input received from the touch-screen of the mobile device to the digital media controller to control display of the digital image on the display screen.

DETAILED DESCRIPTION

Figure 1:
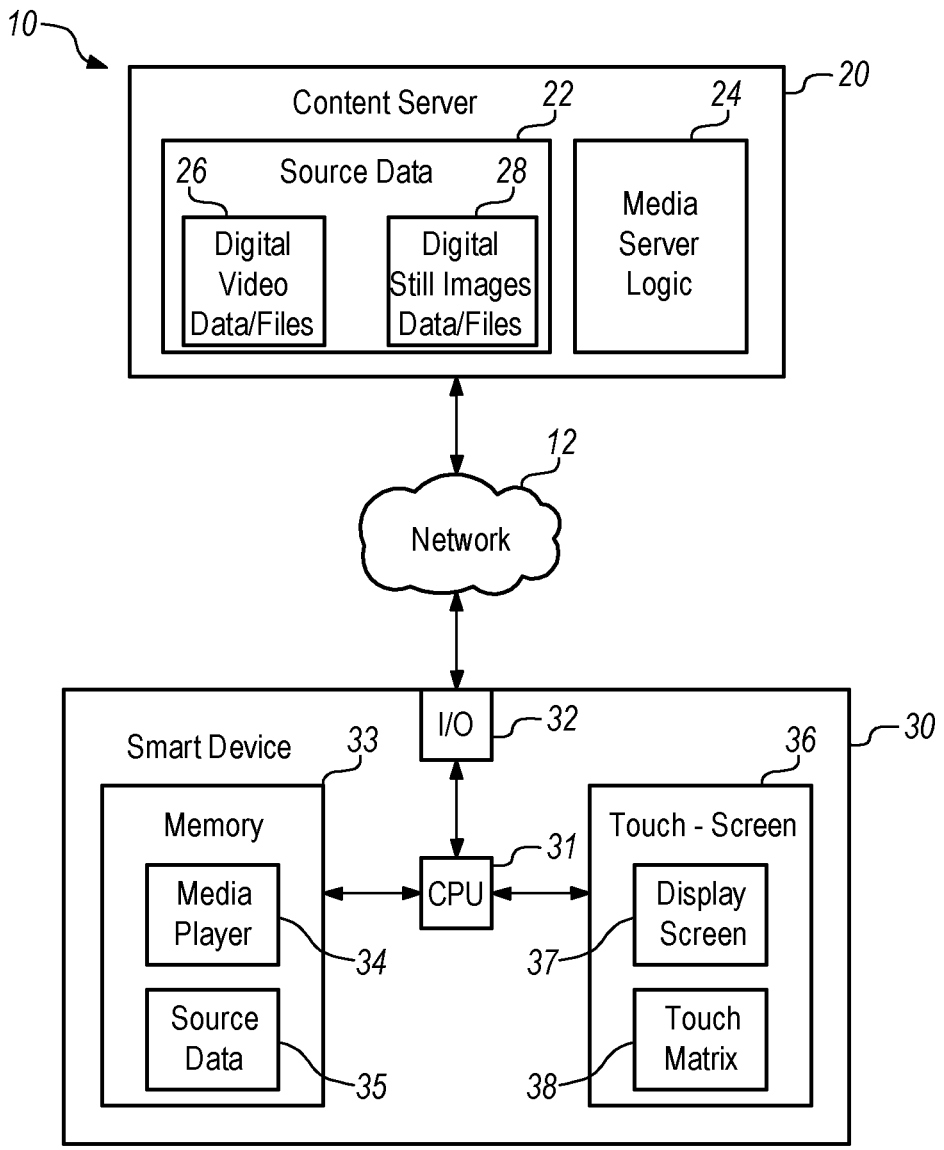
FIG. 1 is a diagram of a system including a smart device in communication with a content server.

Some embodiments provide a computer program product comprising a non-volatile computer readable medium and non-transitory program instructions embodied therein, the program instructions being configured to be executable by a processor to cause the processor to perform various operations. The operations may comprise receiving a first digital image, and identifying a pixel resolution of a display screen, the pixel resolution of the display screen being less than a pixel resolution of the first digital image. The operations may further comprise providing first data to the display screen to cause display of the first digital image at an image resolution adapted to the identified pixel resolution of the display screen, wherein a section of the first digital image displayed on the display screen at the image resolution adapted to the identified pixel resolution of the display screen comprises a first area of the display screen. The operation may still further comprise receiving a user-initiated instruction to zoom in on the section of the first digital image, and providing, in response to receiving the user-initiated instruction to zoom in on the section of the first digital image, second data to the display screen to cause display of the section of the first digital image over a second area of the display screen that is greater than the first area of the display screen.

Some embodiments provide a computer program product comprising a non-volatile computer readable medium and non-transitory program instructions embodied therein, the program instructions being configured to be executable by a processor to cause the processor to perform various operations. The operations may comprise identifying the pixel resolution of a display screen, and providing first data to the display screen to cause display of a first digital image at an image resolution adapted to the identified pixel resolution. The operations may further comprise receiving a user-initiated instruction to zoom in on a section of the first digital image, and providing, in response to receiving the user-initiated instruction to zoom in on the section of the first digital image, second data to the display screen to cause display of the section of the first digital image over an area of the display screen that is greater than an area of the display screen that displays the section of the digital image produced using the first data, wherein the second data causes display of the section of the first digital image at the image resolution adapted to the identified pixel resolution.

The data capable of produce a digital image may be received in any format, including raster formats, vector formats and compound formats, and may or may not be compressed. Furthermore, the digital image may be a still image or video, where digital video data may or may not be in a container along with digital audio data.

Image resolution refers to an amount of detail that an image contains. Advances in camera and display technology have enabled the capture and display of digital images having a high resolution. An image resolution may be described by a number of pixels, such as a total number of pixels (i.e., a 24.3 megapixel camera) or a reference to the number of pixels columns (width) and the number of pixel rows (height) (i.e., a 3840×2160 display screen). However, some industry standards refer specifically to the horizontal pixel count of an images, such as a "4K" resolution having approximately 4,000 pixels (columns) from right to left. Still, the aspect ratio of the display may vary. Embodiments described herein are not limited to any particular manner of expressing an actual or nominal image resolution.

While high definition display screens have been widely adopted, there are still many lower resolution display screens in use. Similarly, high definition image content is in demand, but not all content is available in an image resolution that matches the pixel resolution of every display screen on which the content may be displayed. Of course, the content that is available with a particular image resolution may change over time, while the maximum pixel resolution of a given display screen is fixed. So, there is often a mismatch between the potential digital image resolution of certain digital image content and the maximum pixel resolution of a particular display screen.

The second data or display instructions may produce the section of the digital image over an area of the display screen that is greater than an area of the display screen that displays the section of the digital image produced using the first data. Accordingly, the field of view may be reduced. In a preferred option, some portion of the digital image will be displayed over the entire display screen, so that no portion of the display screen goes unutilized. For example, the second data may produce the section of the digital image over the entire area of the display screen, either in a gradual transition or stepwise transition from the display of the digital image according to the first data.

In some embodiments, the operations may further comprise requesting to receive the first data from a content source, wherein the request includes the identified pixel resolution. This first data is then used in normal display of the digital image(s) on the display screen. For example, the first data may be requested to be received from the content source in response to a user-initiated instruction to view or play the first digital image in the absence of a user-initiated instruction to zoom in on a section of the first digital image. Still further, the operation may comprise requesting, in response to receiving the user-initiated instruction to zoom in on the section of the first digital image, to receive the second data from the content source, wherein the second data has a greater image resolution than the first data. In other words, the higher resolution second data may be requested when the user desired to zoom in on the digital image. The user-initiated instruction to zoom in on a section of the first digital image may also include an amount of magnification to be applied to the first digital image, wherein applying the amount of magnification to the first digital image using the first data would result in an image resolution that is less than the identified pixel resolution.

Some embodiments may include receiving the second data from a content source, and downscaling the second data to locally generate the first data for providing the first data to the display screen, wherein the second data has a greater image resolution than the first data. Furthermore, the second data may be stored on a local data storage device and may be retrieved, in response to receiving the user-initiated instruction to zoom in on the section of the first digital image, from the local data storage device to generate the first data. Some embodiments may store the source data for some period of time or until some amount of data storage is full. In particular, the source data may be temporarily stored even after the corresponding digital image has been displayed. As a result of storing the source data after display, embodiments may return to the stored data for the purpose of using or generating the second data that are needed to produce a selected section of the digital image over an enlarged area of the display screen. The use of the stored second data, which has an image resolution that is greater than the fixed pixel resolution of the connected display, enables the enlarged digital image to be produced and displayed on the display screen at an image resolution adapted to the pixel resolution. In some instances, the enlarged section of the digital image may have the same image resolution as the entire digital image as a result of using the higher resolution data.

Some embodiments may receive one or more user-initiated instruction regarding the control or manipulation of a digital image. While some descriptions herein may refer specifically to a zoom function or instructions, it should be understood that other user-initiated instructions may be received in a similar manner. For example, user-initiated instructions may include zoom, pan, pause, play, scroll and other touch gestures.

In some embodiments, the user-initiated instruction to zoom in on the digital image may be received from a touch-matrix. In one option, the touch-matrix may be a component, either a touchpad or a touchscreen, of a remote control or other mobile computing device that transmits a wireless signal communicating the user-initiated instruction. In another option, the display screen may be a touch-screen and the user-initiated instruction to zoom in on the digital image may be received from the touch-screen. Optionally, the user-initiated instruction to zoom in on the digital image may include, or be accompanied by, an amount of magnification to be applied to the digital image. For example, a zoom gesture on a touch-matrix may control an amount of magnification based upon an amount of separation caused between two initial touchpoints.

In some embodiments, the user-initiated instruction to zoom in on the digital image is received in a wireless signal from a remote control or other mobile computing device, such as a smartphone, table computer, or laptop computer. The wireless signal may be an infrared signal, local area network signal, and/or a personal area network signal. Without limitation, the local area network signal may be a WI-FI signal (WI-FI is a trademark of the Wi-Fi Alliance) signal and the person area network signal may be a BLU-ETOOTH signal (BLUETOOTH is a trademark of the Bluetooth Special Interest Group) or other local radio frequency wireless signal.

In some embodiments, the operations may further include receiving a user-initiated instruction to pan across the digital image being displayed on the display screen. In one example, the user-initiated instruction to pan across the digital image is received in response to a swipe movement on a touch-matrix. The swipe movement (a pan gesture) may include any one or more movement of a touchpoint across the touch-matrix. While a zoom gesture and its corresponding zoom instruction causes a section of the digital image to be enlarged, a pan gesture and its corresponding pan instruction may be used to select a different section of the digital image. Optionally, the pan instructions may be provided before, during or after the zoom instruction.

In embodiments where the digital image is one or more frame of a video, the operations may further include receiving a user-initiated instruction to pause or play the video. For example, a user-initiated instruction to pause or play the video may be received in response to a tap on a touch-matrix. User gestures for control over a video playback may further include a skip backward gesture and/or a skip forward gesture.

In some embodiments, the source image resolution may have a horizontal display resolution of 4,000 pixels or greater. It is believed that 4K and higher video resolutions allow for more picture detail than the human eye can resolve in many viewing scenarios. However, embodiments described may utilize 4K and higher resolutions in a manner to facilitate zooming in on a digital image without loss of the pixel resolution on a display screen.

Some embodiments provide an apparatus comprising at least one non-volatile storage device storing program instructions and at least one processor configured to process the program instructions, wherein the program instructions are configured to, when processed by the at least one processor, cause the apparatus to perform various operations. The operations may comprise receiving a first digital image, and identifying a pixel resolution of a display screen, the pixel resolution of the display screen being less than a pixel resolution of the first digital image. The operations may further comprise providing first data to the display screen to cause display of the first digital image at an image resolution adapted to the identified pixel resolution of the display screen, wherein a section of the first digital image displayed on the display screen at the image resolution adapted to the identified pixel resolution of the display screen comprises a first area of the display screen. The operation may still further comprise receiving a user-initiated instruction to zoom in on the section of the first digital image, and providing, in response to receiving the user-initiated instruction to zoom in on the section of the first digital image, second data to the display screen to cause display of the section of the first digital image over a second area of the display screen that is greater than the first area of the display screen.

Some embodiments of the apparatus may further process the program instructions to implement or initiate any one or more operations of the computer program products described herein. Non-limiting examples of the apparatus may take the form of a smart television, set-top box, tablet computer, mobile computing device and notebook computer.

Some embodiments provide a computer program product comprising a non-volatile computer readable medium and non-transitory program instructions embodied therein, the program instructions being configured to be executable by a processor of a mobile computing device to cause the processor to perform various operations. The operations may comprise establishing a wireless connection with a digital media controller that is providing a digital image to a display screen, receiving input from a touch-screen of the mobile device to control a pan function and/or a zoom function, and wirelessly transmitting the input received from the touch-screen of the mobile device to the digital media controller to control display of the digital image on the display screen. The mobile computing device may take the form of a smartphone, tablet computer, notebook computer, or remote control. On any form of a smart device, the foregoing computer program product may be an app that is downloaded and run on the smart device. The mobile computing device may receive further types of input from a touchscreen and wirelessly transmit that input to the digital media controller to control display of the digital image, such as pause, play, rotate, screen capture, and the like. The touchscreen of the mobile computing device may be leveraged to control how a digital image is displayed on a display device that may not include a touchscreen, touchpad, or other touch matrix. For this purpose, the mobile computing device may provide image control instructions to a smart television, cable box, set-top box, streaming box, or other media controller.

Some embodiments provide a computer program product comprising a non-volatile computer readable medium and non-transitory program instructions embodied therein, the program instructions being configured to be executable by a processor to cause the processor to perform various operations. The operations may comprise identifying the pixel resolution of a display screen, and providing first data to the display screen to cause display of a first digital image at an image resolution adapted to the identified pixel resolution. The operations may further comprise receiving a user-initiated request to download the digital image being displayed on the display screen, and initiating, in response to receiving the user-initiated instruction to download the first digital image displayed on the display screen, transmission of second data for the first digital image to a designated device and/or a designated folder, wherein the second data has an image resolution that is greater than the first data.

Some embodiments may provide an apparatus that may further process the program instructions to implement or initiate any one or more operations of the computer program products described herein. The operation of initiating transmission may include either actually transmitting the requested source data or requesting that the content server transmit the requested source data.

In some embodiments, the operations may further comprise submitting user-account credentials to a content server and obtaining access to the source data in response to submitting valid account credentials. The address of the designated device and/or the designated folder may be stored in association with the account credentials. Optionally, the operation of initiating transmission of the source data for the digital image being displayed to a designated device and/or a designated folder, may include submitting a request to the content server that the source data for the digital image be sent from the content server to the designated device and/or a designated folder. The content server may then transmit the requested source data for the digital image to the smart device that initiated the transmission (such as a smart television or set-top box), the smart device that sent the user-initiated request to download the digital image (such as a smartphone or tablet computer), and/or a further smart device or computer that the user has designated for receiving the requested source data.

Embodiments that download requested source data to a designated device may then use its own installed or web-based image editing software to edit a still picture or a video clip on the designated device, rather than merely controlling the display of the digital image on the display device. Accordingly, the still picture or video clip may then be panned, zoomed, or otherwise edited or enhanced as described above using the local screen of the designated device. Furthermore, the downloaded source data may be viewed and edited at a later time and the display screen that was being used to display the digital image may continue to display additional images.

In some embodiments, the user-initiated request to download the digital image may originate from a remote control or a smart device, such as a smartphone, table computer or notebook computer. A remote control may simply include a dedicated "screen capture" button that submits a request that the digital image from the display or source device be sent to a device and/or folder that has been predesignated in association with the user's account with the content source. A smart device may run an app that enables the initiation of the request to download the digital image to the smart device or other designated device and/or folder.

In some embodiments, a user-initiated request to download a digital image that is currently being displayed by a smart device may be forwarded from the smart device to a content server for handling. The content server may then verify that the request is associated with a valid user-account and/or verify that the content server has permission to share the requested digital image with the requesting device. For example, permission to share a digital image may be limited by the copyright owner. If these conditions are satisfied, then the content server may either transmit the requested content directly to a designated device (i.e., a device and/or folder designated in association with the user-account from which the request is made) or authorize the smart device that is currently displaying the digital image to share the requested digital image with the designated device. Optionally, a digital image may be downloaded either by the content server transmitting the digital image to a designated device, allowing access to the digital image stored on the smart device that is displaying the digital image, or providing the user-account with a link to the digital image in cloud storage. Depending upon the extent of the permissions, a user may subsequently view the digital image, edit the digital image, share the digital image, or post the digital image on social media.

FIG. 1 is a diagram of a system 10 including a smart device 30 in communication with a content server 20. The content server 20 stores source data 22 and run media server logic 24. The media server logic 24 may interact with smart device 30 over a network 12 to receive requests for content and provide source data that has been requested. Optionally, the media server logic 24 may authenticate the smart device 30 as a condition of providing requested content. The source data 22 may include digital video data or files 26 and/or digital still image data or files 28.

The smart device 30 may have any of a variety of form factors, such as a smartphone, tablet computer, notebook computer, or smart television. As shown, the smart device 30 includes a central processor unit (CPU) 31 that is in communication with an input/output interface (I/O) 32, memory 33, and a touchscreen 36. The memory 33 includes a media player application 34 and source data 35, such as the second data, that has been downloaded or buffered from the content server 20. The touchscreen 36 includes both a display screen 37 for displaying digital images and an integral touch matrix 38 for receiving touch gesture input.

Figure 2:
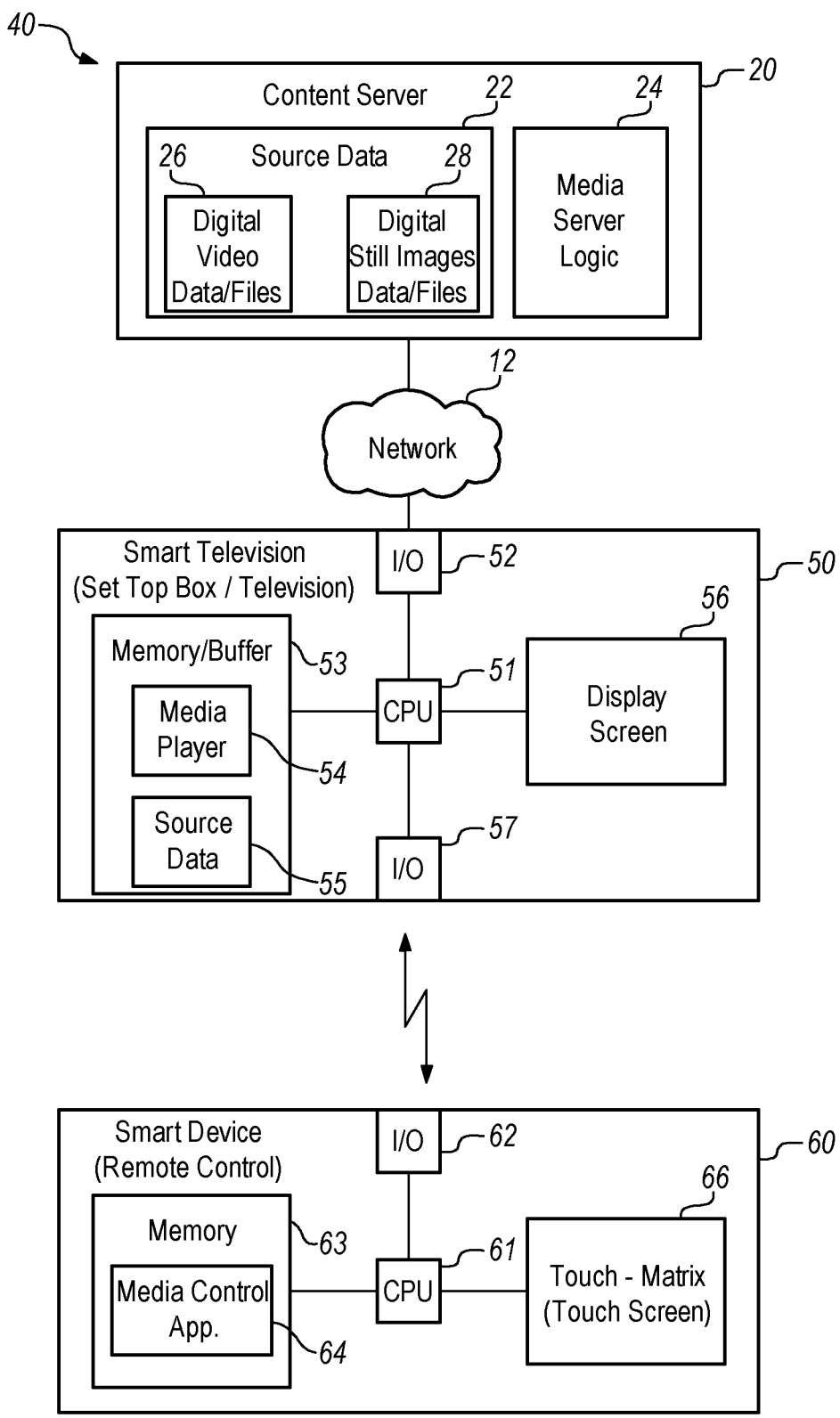
FIG. 2 is a diagram of a system including a smart device that provides a zoom instruction to a smart television in communication with a content server.

FIG. 2 is a diagram of a system 40 including a smart device 60 that provides a zoom instruction to a smart television 50 in communication with a content server 20. The content server 20 and network 12 are the same as those shown in FIG. 1.

The smart television 50, or set-top box and television combination, includes a central processor unit (CPU) 51 that is in communication with an input/output interface (I/O) 52, memory 53, and a display screen 56. The input/output interface 52 may be used to communicate with the content server 20, such as to request certain content and to receive data containing the requested content, such as the first data and/or second data. The memory 53 includes a media player application 54 and source data 55 that has been downloaded or buffered from the content server 20. The display screen 56 displays digital images using display data, such as the first data, received from the CPU 51, but the display screen does not include any feature for directly receiving touch gesture input. The smart television 50 further includes an additional input/output interface 57 for wireless communication with the smart device 60.

The smart device 60, such as a smartphone, tablet computer or remote control, includes a central processor unit (CPU) 61 that is in communication with a wireless input/output interface (I/O) 62, memory 63, and a touch-matrix 66, which may be either a touchpad or a touchscreen. For example, a touchpad might be less expensive and more likely to be implemented in a remote control, whereas a touchscreen might provide a wider range of capabilities and be more likely to be implemented in a tablet computer. The memory 63 may include a media control app 64 that enables touch gestures received via the touch matrix 66 to be transmitted over the wireless I/O 62 to the smart television 50 for control of a digital image displayed on the display screen. In some embodiments, the media control app 64 may be used to submit a request to download the digital image to the smart device 60 or a cloud storage location accessible to the smart device 60. Some embodiments provide the advantage of allowing the control of digital images displayed by the smart television 50 using touch gestures input to a touch matrix of the smart device 60, especially where the smart television does not have its own touch matrix.

Figure 3:
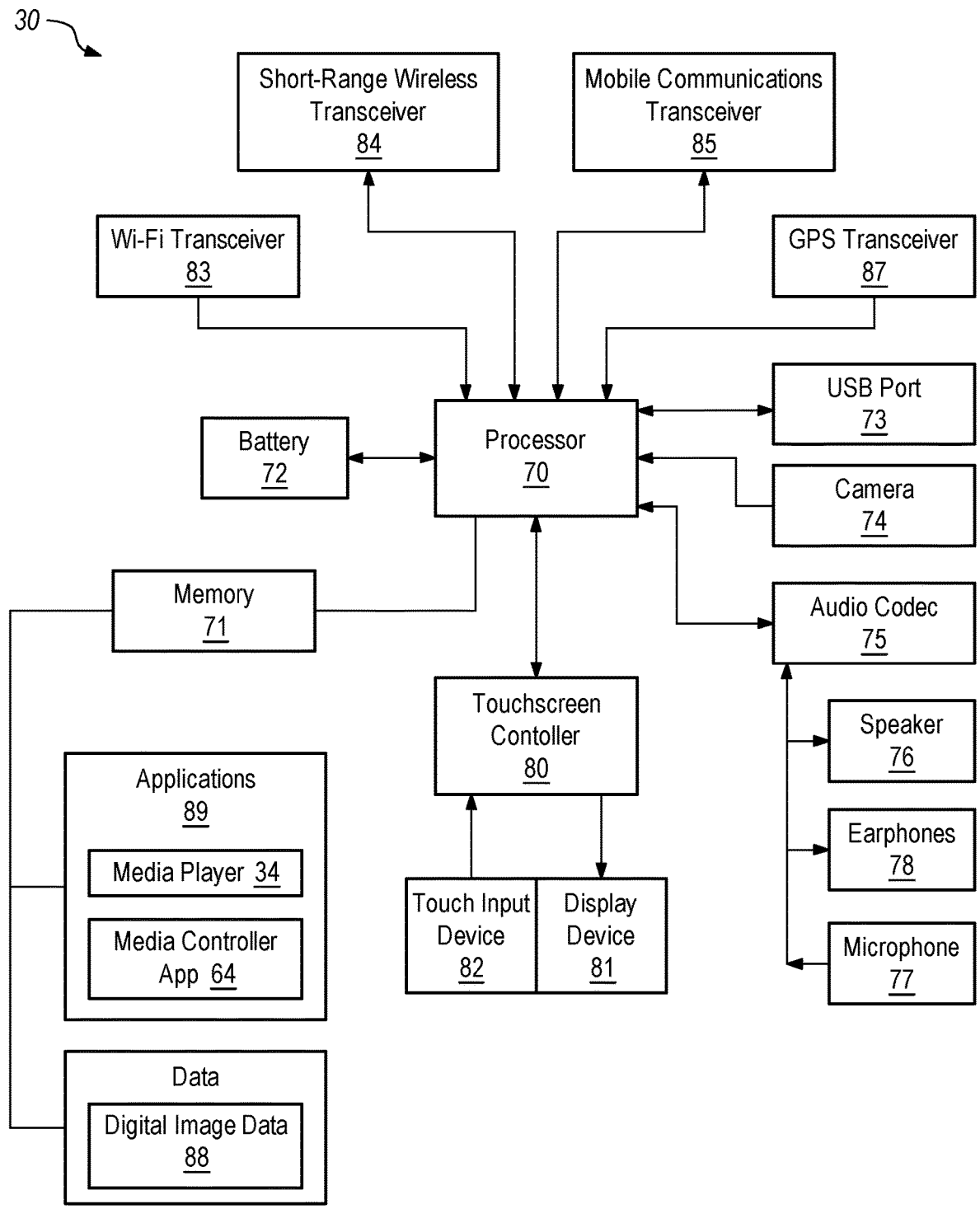
FIG. 3 is a diagram of a smart device.

FIG. 3 is a diagram of the smart device 30 of FIG. 1, which may also be generally representative of the smart television 50 and/or smart device 60 of FIG. 2. The smart device 30 may include a processor 70, memory 71, a battery (or other power source) 72, a universal serial bus (USB) port 73, a camera 74, and an audio codec 75 coupled to a built-in speaker 76, a microphone 77, and an earphone jack 78. The smart device 30 may further include a touchscreen controller 80 which provides a graphical output to the display device 81 and an input from a touch input device 82. Collectively, the display device 81 and touch input device 82 may be referred to as a touchscreen.

The smart device 30 may also include a short-range wireless transceiver 84 (such as a Bluetooth transceiver), a wireless local area network transceiver (such as a "Wi-Fi transceiver") 83, a mobile communication transceiver 85 for communication with a cellular communication network, and a global positioning system (GPS) transceiver 87. Accordingly, the short-range wireless transceiver 84 enables the formation of a short-range wireless connection with other devices having a similar short-range wireless transceiver.

The memory 71 may store one or more applications 89 including program instructions that are executable by the processor 70. Such applications may include a media player (see media player 34 in FIG. 1) and/or a media control app (see media control app 64 in FIG. 2). The memory 71 may also store digital image data 88 according to one or more embodiments.

Figure 4:
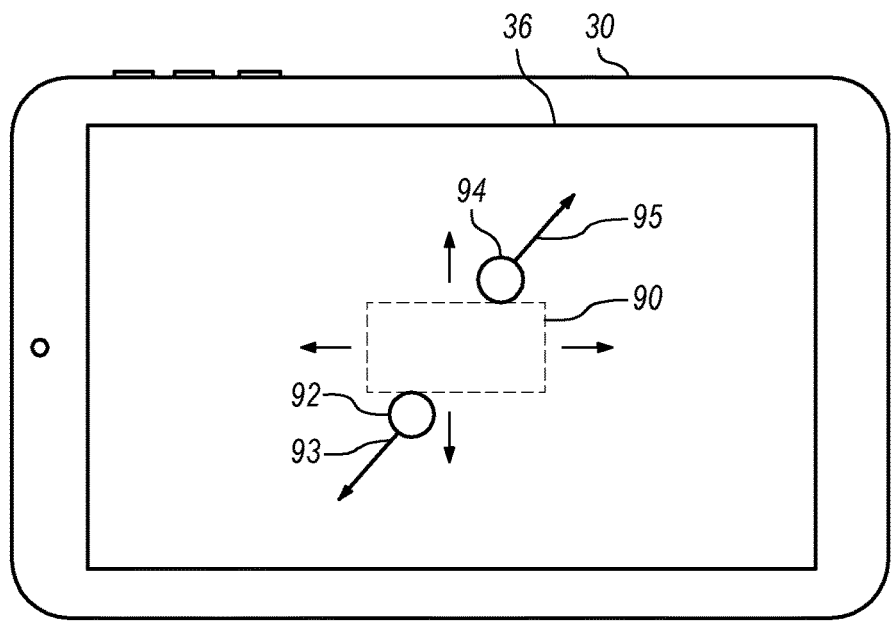
FIG. 4 is a diagram of a smart device, such as a tablet computer having a touch-screen.

FIG. 4 is a diagram of a smart device 30 in the form of a tablet computer having a touch-screen 36 for displaying a digital image and receiving a touch gesture from a user. For example, the smart device 30 is consistent with FIG. 1. As illustrated, if there is a particular section 90 of a displayed digital image that the user wants to "zoom in" in order to narrow the field of view and see greater detail, the user may perform a zoom gesture directly on the touchscreen 36 where the digital image is being displayed. A common form of zoom gesture may be performed by the user placing one finger on the screen at a first point (see circle 92), placing a second finger on the screen at a second point (see circle 94), and then moving the two fingers apart (see arrows 93, 95) while maintaining contact with the touchscreen 36. This will cause the digital image to enlarge to an extent that is proportional to the amount of the separating movement of the two fingers. Using this zoom gesture, the user may cause the particular section 90 to be enlarged to any desired extent, such as filling the entire area of the touchscreen. Other types and combinations of touch gestures may also be input in a similar manner. In particular, a pan gesture may be used to scroll across the digital image so that a desired section of the digital image will be displayed on the display screen even after the zoom.

Figure 5:
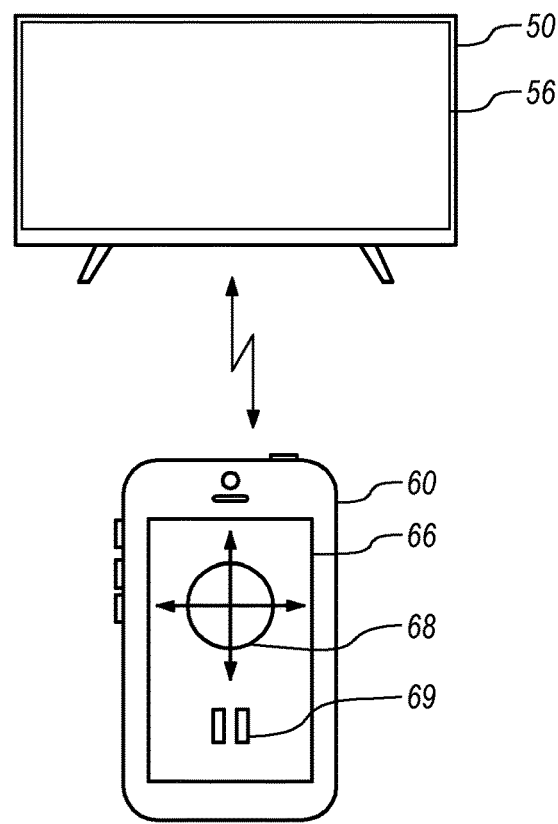
FIG. 5 is a diagram of a smart device in communication with a smart television.

FIG. 5 is a diagram of a smart device 60 in communication with a smart television 50 consistent with FIG. 2. The smart television 50 receives digital images, such as digital video, from a content source for display on the display screen 56. The smart television 50 does not include a touch matrix. However, even if the smart television did include its own touch matrix, a user may prefer the convenience of using the smart device 60 to perform touch gestures that will cause control instructions to be wirelessly transmitted to the smart television for use in controlling how the digital images are displayed on the display screen 56. For example, the user may use the smart device 60 while sitting on a couch across the room from the smart television 50.

In one option, the smart device 60 runs a media control app that captures user gestures from the touchscreen 66 and transmits corresponding control signals to the smart television 50. Optionally, the display screen 66 may display icons, instructions or other visual aids to illustrate or explain gestures that the user may perform. In this illustration, the display screen 66 displays a first icon 68 illustrating a pan gesture and a second icon 69 illustrating a pause function that can be activated to pause a video image by perform a tap gesture over the second icon 69.

By way of example, assume that a basketball game (video content) is being displayed on the smart television 50 and assume that the user wants to determine the brand of shoe that one of the players is wearing. The user could perform a tap gesture on the pause icon 69 while the player's shoes are visible in the currently displayed digital image. The app would then communicate the pause control instruction to the smart television so that the video is paused. Next, the user could perform a pan gesture and/or a zoom gesture to enlarge the section of the paused digital image that contains the shoes and to make sure that this section of the enlarged digital image is displayed on the display screen. After the shoe brand is determined, the user may perform a zoom out gesture and/or a further tap gesture over a play icon. This same process may occur with a remote control or notebook computer having a touchpad or other form a touch matrix.

In some embodiments, the smart device 60 may be used to request download of a digital image at any point in the forgoing process. Optionally, the paused video image may be downloaded so that any subsequent pan, zoom or other gestures may be performed on the paused digital image directly on the display screen 66. Still further, the smart device 60 may be used to request a download or access link be provided to a separately designated device, folder or location.

It should be recognized that if the second data is capable of producing a digital image having a source image resolution, say a 4K image resolution, that is greater than a fixed pixel resolution, say a 1080p pixel resolution, of a display screen, then it is possible to perform approximately 4x zoom before an enlarged section of the digital image would lose any resolution. Embodiments make it possible to avoid loss of image resolution during a zoom function because the second data that is used to prepare first data for producing the digital image on the display screen is also used, in response a user-initiated instruction to zoom in on the digital image being displayed on the display screen, to display an enlarged section of the digital image on the display screen.

Figure 6:
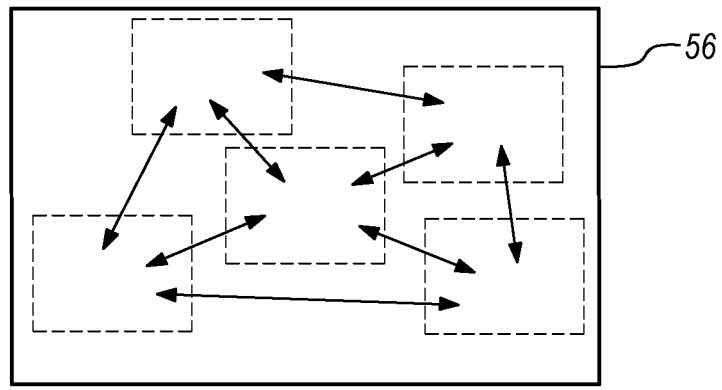
FIG. 6 is a diagram of a display screen illustrating how a pan function may be used to select a section of the digital image.

FIG. 6 is a diagram of a display screen 56 illustrating how a pan function may be used to select a section of the digital image. Various sections of the digital image are illustrated as rectangular areas (outlined in dashed lines) and arrows are used to illustrate pan gestures that might be used to move from one section to another section, preferably in connection with a zoom gesture. In some instances, a zoom gesture may be used followed by the pan function.

Figure 7:
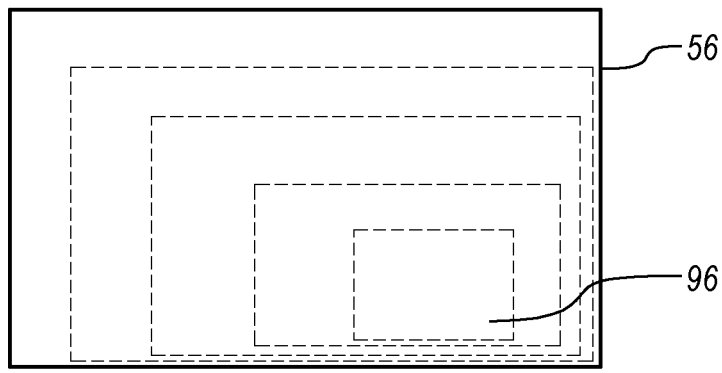
FIG. 7 is a diagram of the display screen illustrating how a zoon function may expand a selected section of the digital image to cover a greater portion of the display screen area.

FIG. 7 is a diagram of the display screen 56 illustrating how a zoom gesture may cause expansion a selected section (outlined in dashed lines) of the digital image to cover a greater portion of the display screen area. For example, using the zoom gesture described in reference to FIG. 4, a user may control the amount of zoom (enlargement or magnification) of the selected section from its original area 96 to the entire area of the display screen 56 or various point there between.

Figure 8:
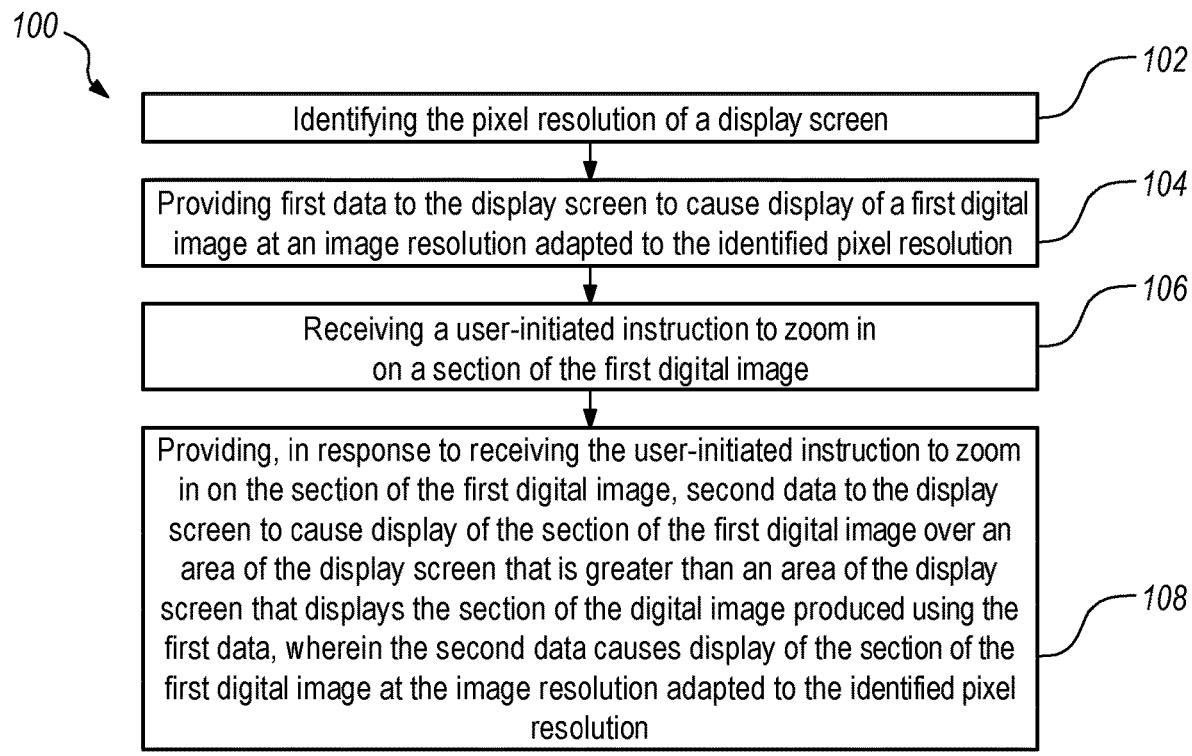
FIG. 8 is a flowchart of a method of zooming in on a section of a digital image.

FIG. 8 is a flowchart of operations 100 performed by a processor. For example, a computer program product comprising a non-volatile computer readable medium may have non-transitory program instructions embodied therein, wherein the program instructions are configured to be executable by a processor to cause the processor to perform various operations. Operation 102 includes identifying the pixel resolution of a display screen. Operation 104 includes providing first data to the display screen to cause display of a first digital image at an image resolution adapted to the identified pixel resolution. Operation 106 includes receiving a user-initiated instruction to zoom in on a section of the first digital image. Operation 108 includes providing, in response to receiving the user-initiated instruction to zoom in on the section of the first digital image, second data to the display screen to cause display of the section of the first digital image over an area of the display screen that is greater than an area of the display screen that displays the section of the digital image produced using the first data, wherein the second data causes display of the section of the first digital image at the image resolution adapted to the identified pixel resolution. Additional operations disclosed herein may also be included in the operations of FIG. 8.

Figure 9:
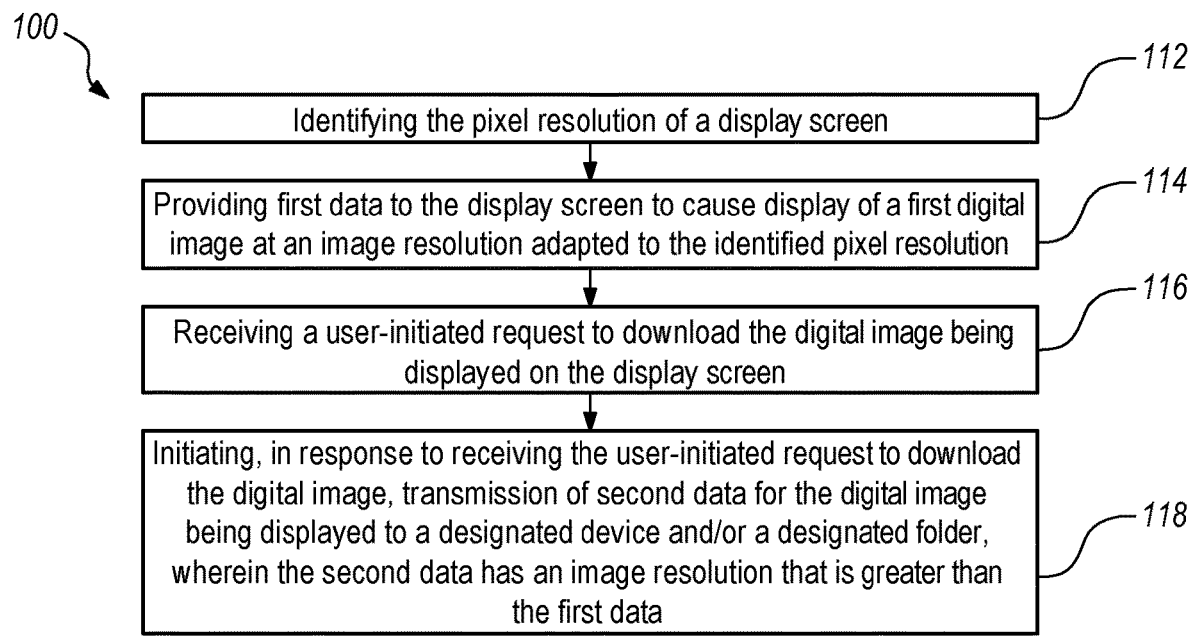
FIG. 9 is a flowchart of a method of downloading a digital image to facilitate a zoom function.

FIG. 9 is a flowchart of operations 110 performed by a processor. For example, a computer program product comprising a non-volatile computer readable medium may have non-transitory program instructions embodied therein, wherein the program instructions are configured to be executable by a processor to cause the processor to perform various operations. Operation 112 includes identifying the pixel resolution of a display screen. Operation 114 includes providing first data to the display screen to cause display of a first digital image at an image resolution adapted to the identified pixel resolution. Operation 116 includes receiving a user-initiated request to download the digital image being displayed on the display screen. Operation 118 includes initiating, in response to receiving the user-initiated request to download the digital image, transmission of second data for the digital image being displayed to a designated device and/or a designated folder, wherein the second data has an image resolution that is greater than the first data. Additional operations disclosed herein may also be included in the operations of FIG. 9.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
   receiving a first digital image at a smart device;
   identifying a pixel resolution of a display screen, the pixel resolution of the display screen being less than a pixel resolution of the first digital image;
   providing first data to the display screen to cause display of the first digital image at an image resolution adapted to the identified pixel resolution of the display screen;
   receiving a user-initiated instruction to download the first digital image displayed on the display screen to a separately designated device; and
   initiating, in response to receiving the user-initiated instruction to download the first digital image displayed on the display screen, transmission of second data for the first digital image to the separately designated device, wherein the second data has an image resolution that is greater than the first data.

2. The computer program product of claim 1, wherein the user-initiated instruction to download the first digital image displayed on the display screen is received from a touch-matrix.

3. The computer program product of claim 2, wherein the touch-matrix is a component of a remote control that transmits a wireless signal communicating the user-initiated instruction.

4. The computer program product of claim 1, wherein the display screen is a touch-screen and the user-initiated instruction to download the first digital image displayed on the display screen is received from the touch-screen.

5. The computer program product of claim 1, wherein the user-initiated instruction to download the first digital image displayed on the display screen is received in a wireless signal from a mobile computing device.

6. The computer program product of claim 1, wherein the first digital image is one or more frame of a video.

7. The computer program product of claim 1, wherein the first digital image is a still image.

8. The computer program product of claim 1, the operations further comprising:
   obtaining access to the second data in response to submitting user account credentials, wherein an address of the separately designated device is stored in association with the user account credentials.

9. The computer program product of claim 8, wherein initiating transmission of the second data for the first digital image being displayed to the separately designated device, includes submitting a request to a content server from which the first digital image is received that the second data for the first digital image be sent from the content server to the separately designated device.

10. The computer program product of claim 9, further comprising:
receiving authorization from the content server to share the requested second data with the separately designated device.

11. The computer program product of claim 1, wherein the smart device is a smart television or a set-top box.

12. The computer program product of claim 1, wherein the smart device is a smartphone or a tablet computer.

13. The computer program product of claim 1, wherein the separately designated device is a smart device other than a first device that performed the operation of initiating transmission of second data for the first digital image and other than a second device from which the user-initiated request to download the digital image was received.

14. The computer program product of claim 1, wherein the smart device is a smart television or a set-top box, and wherein the separately designated device is a smart phone, tablet computer, or notebook computer.

15. The computer program product of claim 1, wherein the separately designated device is a user-designated device.

16. A method, comprising:
receiving a first digital image at a smart device;
identifying a pixel resolution of a display screen, the pixel resolution of the display screen being less than a pixel resolution of the first digital image;
providing first data to the display screen to cause display of the first digital image at an image resolution adapted to the identified pixel resolution of the display screen;
receiving a user-initiated instruction to download the first digital image displayed on the display screen to a separately designated device; and
initiating, in response to receiving the user-initiated instruction to download the first digital image displayed on the display screen, transmission of second data for the first digital image to the separately designated device, wherein the second data has an image resolution that is greater than the first data.

17. The method of claim 16, wherein initiating transmission of the second data for the first digital image being displayed to the separately designated device, includes submitting a request to a content server from which the first digital image is received that the second data for the first digital image be sent from the content server to the separately designated device.

18. The method of claim 16, wherein the first digital image is one or more frame of a video.

19. The method of claim 16, wherein the smart device is a smart television or a set-top box, and wherein the separately designated device is a smartphone, tablet computer, or notebook computer.

20. The method of claim 16, wherein the user-initiated instruction to download the first digital image displayed on the display screen is received from a remote control that transmits a wireless signal communicating the user-initiated instruction.

* * * * *